United States Patent
Dai et al.

(10) Patent No.: US 9,184,881 B2
(45) Date of Patent: Nov. 10, 2015

(54) METHOD FOR FEEDING BACK CONFIRMATION INFORMATION ON A PHYSICAL UPLINK SHARED CHANNEL

(75) Inventors: Bo Dai, Shenzhen (CN); Guanghui Yu, Shenzhen (CN); Shuqiang Xia, Shenzhen (CN); Peng Hao, Shenzhen (CN); Chunli Liang, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 860 days.

(21) Appl. No.: 12/905,299

(22) Filed: Oct. 15, 2010

(65) Prior Publication Data

US 2011/0026444 A1    Feb. 3, 2011

Related U.S. Application Data

(63) Continuation of application No. PCT/CN2009/071008, filed on Mar. 25, 2009.

(51) Int. Cl.
| | |
|---|---|
| *H04L 5/14* | (2006.01) |
| *H04L 1/18* | (2006.01) |
| *H04L 1/16* | (2006.01) |
| *H04W 28/04* | (2009.01) |
| *H04W 72/04* | (2009.01) |

(52) U.S. Cl.
CPC ............ *H04L 1/1867* (2013.01); *H04L 1/1635* (2013.01); *H04L 1/1887* (2013.01); *H04L 1/1896* (2013.01); *H04W 28/04* (2013.01); *H04W 72/042* (2013.01)

(58) Field of Classification Search
None
See application file for complete search history.

(56) References Cited

U.S. PATENT DOCUMENTS

| | | | |
|---|---|---|---|
| 2003/0169701 A1 | 9/2003 | Yun et al. ..................... 370/318 |
| 2004/0224697 A1 | 11/2004 | Hakkinen et al. ............. 455/450 |

(Continued)

FOREIGN PATENT DOCUMENTS

| | | | | |
|---|---|---|---|---|
| CN | 101114868 A | 1/2008 | ............... H04B 7/26 |
| CN | 101267284 A | 9/2008 | ............... H04L 1/16 |
| CN | 101267285 A | 9/2008 | ............... H04L 1/16 |

OTHER PUBLICATIONS

Ericsson, "Details of ACK/NAK Bundling for TDD", 3GPP Draft; R1-081528, vol. RAN WGI, no. Shenzhen, China; Mar. 27, 2008, 4 pages.

(Continued)

*Primary Examiner* — Chi H Pham
*Assistant Examiner* — Raul Rivas

(57) ABSTRACT

A method for feeding back confirmation information on a physical uplink shared channel, this method includes: an eNodeB carries, in downlink control information, a number value of the downlink sub-frame corresponding to the confirmation information which is fed back by one uplink sub-frame, and transmits data on a plurality of continuous downlink sub-frames after the sub-frame carrying the downlink control information, wherein the number of the downlink sub-frames which transmit the data is equal to an number of the downlink sub-frames corresponding to the confirmation information fed back by the one uplink sub-frame; after the user equipment receives the downlink sub-frame which carries the downlink control information, the data is received from the downlink sub-frame which transmits the data after this downlink sub-frame, and the confirmation information received is fed back to the eNodeB through a physical uplink shared channel through an uplink sub-frame.

14 Claims, 2 Drawing Sheets

(56) References Cited

U.S. PATENT DOCUMENTS

| | | | |
|---|---|---|---|
| 2009/0046649 A1* | 2/2009 | Gao et al. | 370/329 |
| 2010/0074153 A1* | 3/2010 | Torsner et al. | 370/280 |
| 2011/0211538 A1* | 9/2011 | Kakura | 370/329 |

OTHER PUBLICATIONS

Ericsson et al, "Uplink ACK/NACK Timing for TDD", 3GPP Draft; R1-081542, vol. RAN WGI, Mar. 27, 2008, 4 pages.

Ericsson, "Uplink Transmission of ACK/NACK for E-UTRA TDD", 3GPP Draft; R1-071894 vol. RAN WGI, Apr. 17, 2007, 3 pages.

LG Electronics, "Handling Problem with Uplink ACK/NACK Bundling", 3GPP Draft; R1-081256, vol. RAN WGI, no. Shenzhen, China; Mar. 26, 2008, 4 pages.

* cited by examiner

METHOD FOR FEEDING BACK CONFIRMATION INFORMATION ON A PHYSICAL UPLINK SHARED CHANNEL

This is a continuation of International Application PCT/CN/2009/071008, with an International Filing Date of Mar. 25, 2009, which claims priority to Chinese Application No. 200810096053.2, filed Apr. 25, 2008, each of which is incorporated by reference.

FIELD OF THE INVENTION

The present invention relates to communication field, and in particular to a method for feeding back confirmation information on a physical uplink shared channel (PUSCH).

BACKGROUND OF THE INVENTION

FIG. 1 shows the frame structure of the Time Division Duplex ("TDD" for short) mode of a Long Term Evolution ("LTE" for short) system. As shown in FIG. 1, in such a frame structure, one radio frame of 10 ms is divided into two half frames, and each of which is divided into 10 time slots with a length of 0.5 ms, and two adjacent time slots form a sub-frame with a length of 1 ms. One half frame includes 5 sub-frames. For a Normal Cyclic Prefix ("Normal CP" for short), one time slot includes 7 symbols with a length of 66.7 us, wherein the CP length of the first symbol is 5.21 us, and the CP lengths of the other six symbols are 4.69 us; and for an Extended CP, one time slot includes 6 symbols, the CP lengths of all the symbols are 16.67 us. In this frame structure, the configuration of the sub-frames has the following characteristics:

(1) With reference to Table 1, LTE TDD defines 7 kinds of configuration solutions for the number of the uplink/downlink sub-frames in one radio frame in order to reduce the number of configurations for the number of the uplink/downlink sub-frames. All of the sub-frames can be classified into three categories: one category is a downlink sub-frame, another category is a special sub-frame, and the other category is an uplink sub-frame. As in configuration 1, the sub-frames 2, 3, 7 and 8 are used for uplink transmission, the sub-frames 0, 4, 5 and 9 are used for downlink transmission, and meanwhile the sub-frames 1 and 6 are special sub-frames (2) The special sub-frame includes 3 special time slots, namely, a Downlink Pilot Time Slot ("DwPTS" for short), a Guard Period ("GP" for short) and an Uplink Pilot Time Slot ("UpPTS" for short), wherein the DwPTS is used for downlink, and at least one symbol is used to transmit the Primary-Synchronization Channel ("P-SCH" for short); the GP is a guard time without transmitting any data; and the UpPTS is used for uplink and may be used to transmit signals such as sounding reference signal and the Random Access Channel ("RACH" for short);

(3) The sub-frame immediately before the special sub-frame is fixedly used for the downlink transmission; and the sub-frame immediately after the special sub-frame is fixedly used for the uplink transmission.

TABLE 1

| DL/UL Proportion Configuration | Conversion Point Period | Sub-frame Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

Table 1 shows the LTE TDD uplink/downlink proportion configuration, wherein D represents the downlink sub-frame, U represents the uplink sub-frame and S represents the special sub-frame.

TABLE 2

| DL/UL Proportion Configuration | Conversion Point Period | Sub-frame Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | — | — | 1 | — | 1 | — | — | 1 | — | 1 |
| 1 | | — | — | 2 | 1 | — | — | — | 2 | 1 | — |
| 2 | | — | — | 4 | — | — | — | — | 4 | — | — |
| 3 | 10 ms | — | — | 3 | 2 | 2 | — | — | — | — | — |
| 4 | | — | — | 4 | 4 | — | — | — | — | — | — |
| 5 | | — | — | 9 | — | — | — | — | — | — | — |
| 6 | | — | — | 1 | 1 | 1 | — | — | 1 | 1 | — |

Table 2 shows the number of the corresponding downlink sub-frames when the uplink sub-frames feed back the confirmation information.

In the LTE TDD, a UE should feed back, in Physical Uplink Control Channel ("PUCCH" for short) of the uplink sub-frame in sub-frame n+k (k>3), the acknowledgement/negative acknowledgement message (ACK/NACK) of the data in a Physical Downlink Shared Channel ("PDSCH" for short) of the downlink sub-frame n, and may also feed back the confirmation information ACK/NACK in the physical uplink shared channel for transmitting the uplink data in this uplink sub-frame. Wherein the index of the uplink sub-frame PUCCH is implicitly indicated by sending the serial number of the sub-frame of the downlink data and the smallest index of the Control Channel Element ("CCE" for short) where its corresponding Physical Downlink Control Channel ("PDCCH" for short) is located;

Downlink Control Information ("DCI" for short) Format 0 is used to transmit the control information associated with the PUSCH;

In some configurations of the number of the uplink/downlink sub-frames of the LTE TDD, the number of the downlink sub-frames allocated will be greater than the number of the uplink sub-frames allocated, i.e., one uplink sub-frame should feed back the ACK/NACK information of a plurality of PDSCH sub-frames (Table 2 shows the corresponding number of ACK/NACK when the uplink sub-frames feed back the downlink PDSCH in different configurations in Table 1). Since LTE uplink should satisfy the characteristic of single carrier, one problem which is needed to be solved is how to feed back the ACK/NACK information of a plurality of the downlink PDSCH sub-frames in one uplink sub-frame. One method is to transmit the ACK/NACK information of a plurality of the downlink sub-frames together with the uplink data on the Physical Uplink Shared Channel ("PUSCH" for short).

When the above method is used, if the control channel corresponding to the downlink data is not correctly detected, a User Equipment ("UE" for short) will not feed back the ACK/NACK information, i.e., the situation of Discontinuous Transmission ("DTX" for short) occurs, then the confirmation information corresponding to this downlink data cannot be sent on the PUSCH together with the confirmation information corresponding to other downlink data. Since the eNodeB does not know whether a DTX occurs to the sent downlink data, or to which downlink data the DTX occurs, if the downlink data is still regarded as being all received, it is quite easy to mistakenly feed back an ACK as the confirmation information that should be fed back as an NACK (the DTX should be regarded as the NACK), and further possibly, since the amount of the confirmation information fed back is inconsistent, it results in erroneous detection of the confirmation information of other downlink data, then the situation that the downlink sub-frame data is lost occurs, and UE cannot correctly obtain the information transferred by the received data block, thereby a re-transmission processing by a higher layer being required, which increases additional delay.

However, a technical solution which is able to solve the problem of the lost of the downlink data is still not provided currently.

SUMMARY OF THE INVENTION

The present invention is proposed with considering the problem of the lost of the downlink data existed in the related art above. Therefore, the main objective of the present invention is to provide an improved solution for feeding back messages on the physical uplink shared channel, so as to solve the above problem.

In order to accomplish the above objective, according to one aspect of the present invention, a method for feeding back confirmation information on a physical uplink shared channel is provided, which is used for enabling a user equipment to feed back to an eNodeB whether data of a downlink sub-frame is correctly received in a situation that a number of the downlink sub-frames is greater than a number of uplink sub-frames in a time division duplex system.

The method includes: the eNodeB carries, in downlink control information, a number value of the downlink sub-frame corresponding to the confirmation information which is fed back by one uplink sub-frame, and transmits data on a plurality of continuous downlink sub-frames after the sub-frame carrying the downlink control information, wherein the number of the downlink sub-frames which transmit the data is equal to an number of the downlink sub-frames corresponding to the confirmation information fed back by the one uplink sub-frame; after the user equipment receives the downlink sub-frame which carries the downlink control information, the data is received from the downlink sub-frame which transmits the data after this downlink sub-frame, and the confirmation information received is fed back to the eNodeB through a physical uplink shared channel through an uplink sub-frame.

Wherein the eNodeB uses a signaling in the downlink control information for representing an index of the uplink sub-frame for transmitting uplink data in the situation that the number of the downlink sub-frames is smaller than the number of the uplink sub-frames to carry the number of the downlink sub-frames corresponding to the confirmation information which is fed back by the one uplink sub-frame.

In addition, the eNodeB determines a set of number values of all the downlink sub-frames corresponding to information which is fed back by the one uplink sub-frame according to a configuration pattern for the current number of downlink/uplink sub-frames, and selects corresponding number values from the set according to an amount of the data actually required to be transmitted to be carried in the downlink control information.

Preferably, the eNodeB sends a control signaling associated with the allocation of the physical uplink shared channel on a first downlink sub-frame in the downlink sub-frames corresponding to the confirmation information fed back by the uplink sub-frame.

Moreover, in the uplink sub-frames fed back to the eNodeB, the user equipment, according to the order of serial numbers of the received downlink sub-frames which transmit the data, receives each downlink sub-frame which transmits the data and feeds back corresponding confirmation information.

Preferably, in a situation that the user equipment fails to detect a physical downlink control channel corresponding to transmitted data in the sub-frame transmitting the data, or fails to receive the data thereof, the user equipment feeds back a negative acknowledgement message as the confirmation information of this downlink sub-frame; in a situation that the user equipment detects the physical downlink control channel corresponding to the transmitted data in the sub-frame transmitting the data, the user equipment analyzes the data in this downlink sub-frame, and feeds back an acknowledgement message as the confirmation information in a situation that the analysis is successful, otherwise, the negative acknowledgement message is fed back as the confirmation information.

Wherein on one hand, in a situation that the data in the downlink sub-frame that transmits the data is sent as a single codeword stream, each piece of confirmation information in the uplink sub-frame fed back by the user equipment to the eNodeB corresponds to a codeword stream of one downlink sub-frame that transmits the data; in a situation that the data in the downlink sub-frame that transmits the data is sent as multiple codeword streams, for one downlink sub-frame that transmits the data, the UE acquires the confirmation information corresponding to each codeword stream thereof, in a situation that any one or more pieces of confirmation information among the confirmation information acquired is the negative acknowledgement message, the user equipment sets the confirmation information of this downlink sub-frame as a negative acknowledgement; in a situation that all the confirmation information acquired is the acknowledgement message, the user equipment sets the confirmation information of this downlink sub-frame as an acknowledgement.

On the other hand, in a situation that the user equipment feeds back a plurality of groups of the confirmation information, an amount of the confirmation information fed back in each group is equal to a maximum number of codeword streams in this downlink sub-frame, and respective confirmation information in each group corresponds to the confirmation information of the codeword stream of a corresponding downlink sub-frame; in the situation that the number of codeword streams of the downlink sub-frames is smaller than the maximum number of the codeword streams of the downlink sub-frame, the user equipment feeds back the confirmation information of the number of the maximum codeword streams, wherein confirmation information without a corresponding codeword stream is set as a predefined fixed value; when the user equipment fails to detect the physical downlink control channel corresponding to the transmitted data in the sub-frame which transmits the data, the user equipment feeds back the negative acknowledgement message as the confirmation information of each codeword stream in a group corresponding to this downlink sub-frame.

Besides, in the situation that the downlink sub-frames sent by the eNodeB to the user equipment includes special sub-frames which cannot transmit data, the user equipment does not consider the special sub-frames when feeding back the confirmation information.

In order to accomplish the above objective, according to another aspect of the present invention, a method for feeding back confirmation information on a physical uplink shared channel is provided.

The method for feeding back confirmation information on a physical uplink shared channel according to the present invention includes: in a situation that a user equipment fails to detect a physical downlink control channel corresponding to transmitted data in a sub-frame transmitting data, or fails to receive the data thereof, the user equipment feeds back a negative acknowledgement message as confirmation information of this downlink sub-frame; in a situation that the user equipment detects the physical downlink control channel corresponding to the transmitted data in the sub-frame transmitting the data, the user equipment analyzes data in this downlink sub-frame, and feeds back an acknowledgement message as the confirmation information in a situation that the analysis is successful, otherwise, the negative acknowledgement message is fed back as the confirmation information.

Wherein on one hand, in a situation that the data in the downlink sub-frame that transmits the data is sent as a single codeword stream, each piece of confirmation information in the uplink sub-frame fed back by the user equipment to the eNodeB corresponds to a codeword stream of one downlink sub-frame that transmits the data; in a situation that the data in the downlink sub-frame which transmits the data is sent as multiple codeword streams, for one downlink sub-frame that transmits the data, the UE acquires the confirmation information corresponding to each codeword stream thereof, in a situation that any one or more pieces of confirmation information among the confirmation information acquired is the negative acknowledgement message, the user equipment sets the confirmation information of this downlink sub-frame as a negative acknowledgement; in a situation that all the confirmation information acquired is the acknowledgement message, the user equipment sets the confirmation information of this downlink sub-frame as an acknowledgement.

On the other hand, in a situation that the user equipment feeds back a plurality of groups of the confirmation information, an amount of the confirmation information fed back in each group is equal to a maximum number of codeword streams in this downlink sub-frame, and respective confirmation information in each group corresponds to the confirmation information of the codeword stream of a corresponding downlink sub-frame; in a situation that the number of the codeword streams of the downlink sub-frame is smaller than the maximum number of the codeword streams of the downlink sub-frame, the user equipment feeds back the confirmation information of the maximum number of the codeword streams, wherein confirmation information without a corresponding codeword stream is set as a predefined fixed value; when the user equipment fails to detect the physical downlink control channel corresponding to the transmitted data in the sub-frame which transmits the data, the user equipment feeds back the negative acknowledgement message as the confirmation information of each codeword stream in a group corresponding to this downlink sub-frame.

By the above technical solutions of the present invention, the feedback efficiency and system work efficiency can be improved, the characteristic of the uplink single carrier is ensured, the problem of the lost of the downlink data is solved, the delay is reduced, and the capability of the system is ensured.

BRIEF DESCRIPTION OF THE DRAWINGS

The drawings illustrated here provide a further understanding of the present invention and form a part of the present application. The exemplary embodiments of the present invention and description thereof are used to explain the present invention without unduly limiting the scope of the invention, wherein.

DETAILED DESCRIPTION OF EMBODIMENTS

Function Overview

As mentioned above, the problem of the lost of the downlink data will be resulted in by the application of the method for transmitting ACK/NACK information of a plurality of the downlink sub-frames together with the uplink data in PUSCH to solve the problem of how to feed back the ACK/NACK information of a plurality of downlink PDSCH sub-frames in one uplink sub-frame. In order to solve the problem of the lost of the downlink data, the present invention provides an improved solution for feeding back messages on the physical uplink shared channel, i.e., the eNodeB carries, in downlink control information, a number value of the downlink sub-frame corresponding to the confirmation information which is fed back by one uplink sub-frame, and transmits data on a plurality of continuous downlink sub-frames after the sub-frame carrying the downlink control information, wherein the number of the downlink sub-frames which transmit the data is equal to an number of the downlink sub-frames corresponding to the confirmation information fed back by the one uplink sub-frame; after the user equipment receives the downlink sub-frame which carries the downlink control information, the data is received from the downlink sub-frame which transmits the data after this downlink sub-frame, and the confirmation information received is fed back to the eNodeB through a physical uplink shared channel through an uplink sub-frame.

The present invention will be described hereinafter in detail in conjunction with the drawings thereof and the embodiments. It should be indicated that the embodiments and the features in the embodiments of the present application can be combined with each other if they are not conflicted.

In the embodiments of the present invention, an method for feeding back confirmation information on a PUSCH is provided, which is used for enabling a UE to feed back to an eNodeB whether data of a downlink sub-frame is correctly received in a situation that a number of the downlink sub-frames is greater than a number of uplink sub-frames in a time division duplex system.

Figure 1:
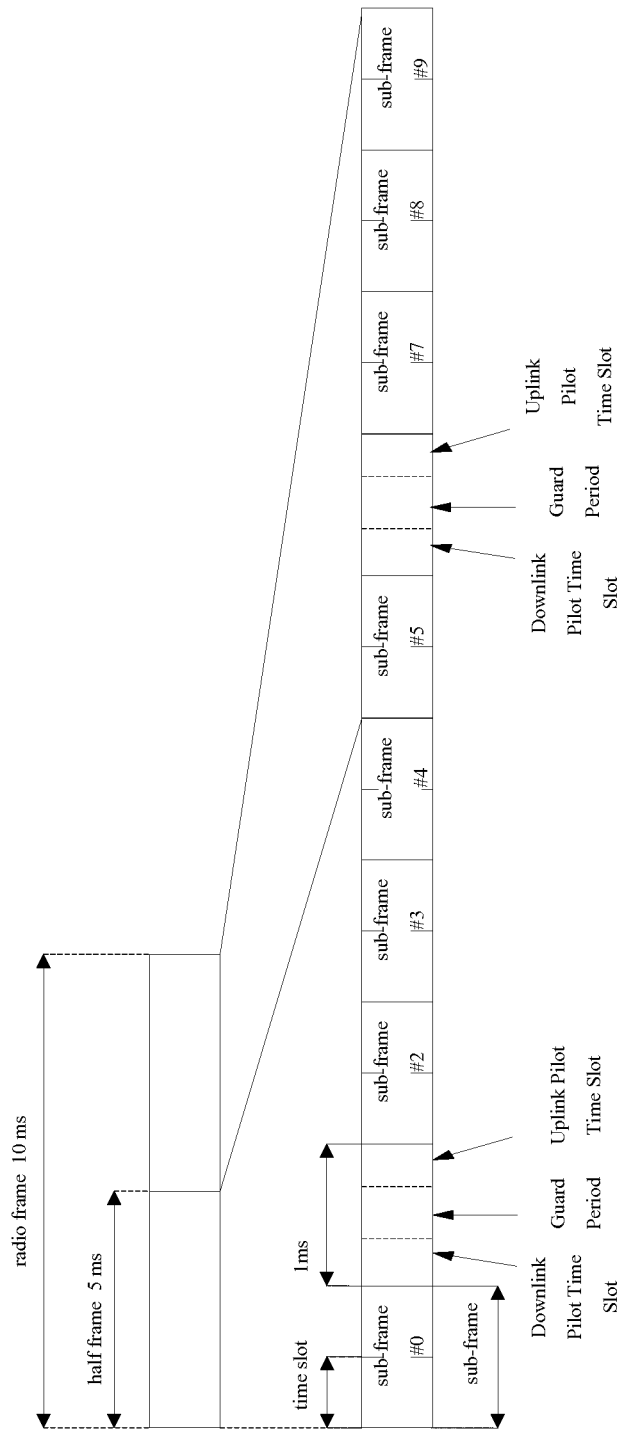
FIG. 1 is a schematic drawing of the frame structure of the LTE system under the TDD mode according to the related art.
Figure 2:
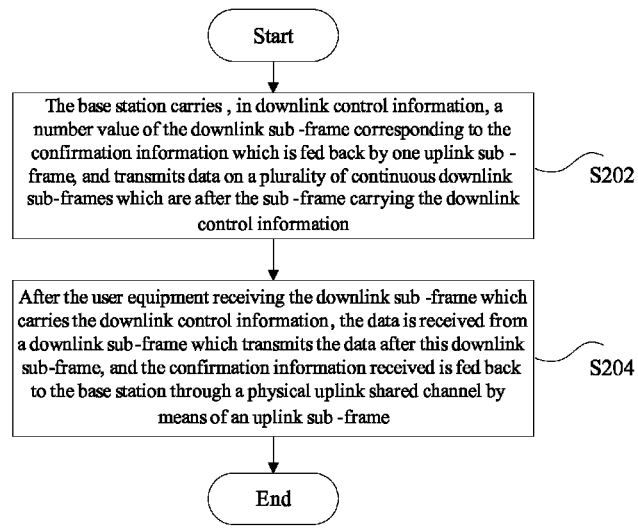
FIG. 2 is a flow chart of the method for feeding back confirmation information on the PUSCH according to the embodiments of the present invention.

FIG. 2 is a flow chart of the method for feeding back confirmation information on the PUSCH according to the embodiments of the present invention, as shown in FIG. 2, the method for feeding back confirmation information on a physical uplink shared channel according to the embodiments of the present invention includes: step S202, the eNodeB carries, in downlink control information (DCI), a number value of the downlink sub-frame corresponding to the confirmation information which is fed back by one uplink sub-frame, and transmits data on a plurality of continuous downlink sub-frames after the sub-frame carrying the DCI, wherein the number of the downlink sub-frames which transmit the data is equal to an number of the downlink sub-frames corresponding to the confirmation information fed back by the one uplink sub-frame; step S204, after the UE receives the downlink sub-frame which carries the DCI, the data is received from the downlink sub-frame which transmits the data after this downlink sub-frame, and the confirmation information received is fed back to the eNodeB through a physical uplink shared channel through an uplink sub-frame.

Wherein the eNodeB uses a signaling in the DCI to carry the number of the downlink sub-frames corresponding to the confirmation information which is fed back by the one uplink sub-frame. This signaling is used to represent the index of the uplink sub-frame for transmitting the uplink data in the situation that the number of the downlink sub-frames is smaller than the number of the uplink sub-frames.

A signaling representing the number (k) of the downlink sub-frames corresponding to the confirmation information which is fed back in one uplink sub-frame is sent in DCI format 0; i.e., when the number of the downlink sub-frames is greater than the number of the uplink sub-frames, the signaling representing the index of the uplink sub-frame where the uplink data is transmitted in the TDD system in DCI format 0 may be multiplexed (i.e., redefined) to represent a signaling of the number of the downlink sub-frame corresponding to the confirmation information which is fed back in one uplink sub-frame. Moreover, this signaling may also represent that k continuous downlink sub-frames, starting from the downlink sub-frame carrying DCI format 0, are sent with the data of an object UE; k is one element in the set H, and the value of k is indicated by the signaling used to represent the index of the uplink sub-frame where the uplink data is transmitted in the TDD system.

In addition, the eNodeB determines a set of number values of all the downlink sub-frames corresponding to information which is fed back by the one uplink sub-frame according to a configuration pattern for the current number of downlink/uplink sub-frames, and selects corresponding number values from the set according to an amount of the data actually required to be transmitted to be carried in the DCI.

That is to say, the value range (set H) of the above k is selected according to the uplink/downlink proportion configuration. For example, for a 5 ms period conversion point, the selection according to the configuration pattern is as follow:

Configuration 1, H is any nonempty subset of the set M, wherein M={1, 2}; and it is recommended that H={1, 2};

Configuration 2, H is any nonempty subset of the set M, wherein M={1, 2, 3, 4}; and it is recommended that H={1, 2, 3, 4};

For a 10 ms period conversion point, the selection is as follow:

Configuration 3, H is any nonempty subset of the set M, wherein M={1, 2, 3}; and it is recommended that H={1, 2, 3};

Configuration 4, H is any nonempty subset of the set M, wherein M={1, 2, 3, 4}; and it is recommended that H={1, 2, 3, 4};

Configuration 5, H is any nonempty subset of the set M, wherein M={1, 2, 3, 4, 5, 6, 7, 8, 9}; and it is recommended that H={1, 2, 3, 4}, or H={1, 3, 6, 9}.

Moreover, in the uplink sub-frames fed back to the eNodeB, the UE, according to the order of serial numbers of the received downlink sub-frames which transmit the data, receives each downlink sub-frame which transmits the data and feeds back corresponding confirmation information.

Furthermore, in this method, in a situation that the UE fails to detect the physical downlink control channel corresponding to the transmitted data in the sub-frame transmitting the data, or fails to receive the data thereof, the UE feeds back an NACK message as the confirmation information of this downlink sub-frame; in a situation that the UE detects the physical downlink control channel corresponding to the transmitted data in the sub-frame transmitting the data, the UE analyzes the data in this downlink sub-frame, and feeds back an ACK message as the confirmation information in a situation that the analysis is successful, otherwise, the UE feeds back the NACK message as confirmation information.

That is to say, starting from the downlink sub-frame that sends the control signaling associated with the uplink data, the ACK/NACK is sequentially fed back according to the serial numbers of the downlink sub-frames, the order of feeding back the ACK/NACK corresponds to the order of the downlink sub-frames where the ACK/NACK is located; when the UE fails to detect the corresponding PDCCH on the downlink sub-frame that should transmit the data, the confirmation information fed back by this downlink sub-frame is the NACK; if the corresponding PDCCH is detected, the data is analyzed and the corresponding ACK/NACK is fed back.

Moreover, in a situation that the data in the downlink sub-frame that transmits the data is sent as a single codeword stream, each piece of confirmation information in the uplink sub-frame fed back by the UE to the eNodeB corresponds to the codeword stream of one downlink sub-frame that transmits the data; in a situation that the data in the downlink sub-frame that transmits the data is sent as multiple codeword streams, for one downlink sub-frame that transmits the data, the user equipment acquires the confirmation information corresponding to each codeword stream thereof, in a situation that any one or more pieces of the confirmation information among the acquired confirmation information is the NACK message, the UE sets the confirmation information of this downlink sub-frame as an NACK; and in a situation that all of the acquired confirmation information is the ACK message, the UE sets the confirmation information of this downlink sub-frame as an ACK.

That is to say, assume that the ACK/NACK information of k downlink sub-frames is fed back on one uplink sub-frame, when k>1, each downlink sub-frame feeds back one piece of the ACK/NACK information, when the downlink data is sent as a single codeword stream, each downlink sub-frame that transmits the single codeword stream feeds back one ACK/NACK; when the downlink data is sent as multiple codeword streams, each downlink sub-frame that transmits the multiple codeword streams performs "and" operation to the ACK/NACK corresponding to all the codeword streams first, then, the result of and operation is fed back to the eNodeB;

While when k=1, the and operation is not needed for the multiple codeword streams, the ACK/NACK corresponding to each codeword stream is directly fed back according to the order of the serial numbers of the codeword streams.

On the other hand, in a situation that the user equipment feeds back a plurality of groups of the confirmation information, an amount of the confirmation information fed back in each group is equal to a maximum number of codeword streams in this downlink sub-frame, and respective confirmation information in each group corresponds to the confirmation information of the codeword stream of a corresponding downlink sub-frame; in the situation that the number of codeword streams of the downlink sub-frames is smaller than the maximum number of the codeword streams of the downlink sub-frame, the user equipment feeds back the confirmation information of the number of the maximum codeword streams, wherein confirmation information without a corresponding codeword stream is set as a predefined fixed value; when the user equipment fails to detect the physical downlink control channel corresponding to the transmitted data in the sub-frame which transmits the data, the user equipment feeds back the negative acknowledgement message as the confirmation information of each codeword stream in a group corresponding to this downlink sub-frame.

That is to say, in a situation that the ACK/NACK information of k downlink sub-frames is fed back on one uplink sub-frame and the maximum number of codeword streams of the downlink sub-frames is m, the UE feeds back k groups of the ACK/NACK information, each group corresponds to one downlink sub-frame and includes m pieces of the ACK/NAACK information, each piece of the ACK/NACK information in the group corresponds to the ACK/NACK information of one codeword stream in the downlink sub-frame corresponding to the group, and in the situation of the single codeword stream the ACK/NACK information of the other codeword streams is default value, the default value is the NACK information.

In the situation that the downlink sub-frames sent by the eNodeB to the user equipment includes the special sub-frames that cannot transmit the data, the user equipment does not consider the special sub-frames when feeding back the confirmation information, i.e., when the special sub-frames fail to send the downlink data, the special sub-frames are not included in the above continuous downlink sub-frames, and the special sub-frames may not be included in the calculation of the eNodeB or the receipt of the UE, at this moment, the special sub-frames do not need to feed back the ACK/NACK information.

Preferably in this method, DCI format 0 will be sent on the first downlink sub-frame in the downlink sub-frames corresponding to the confirmation information fed back by this uplink sub-frame.

Besides, the ACK/NACK information fed back may be sent on the PUSCH together with the uplink data.

The present invention will be described hereinafter in conjunction with the embodiments.

Figure 3:
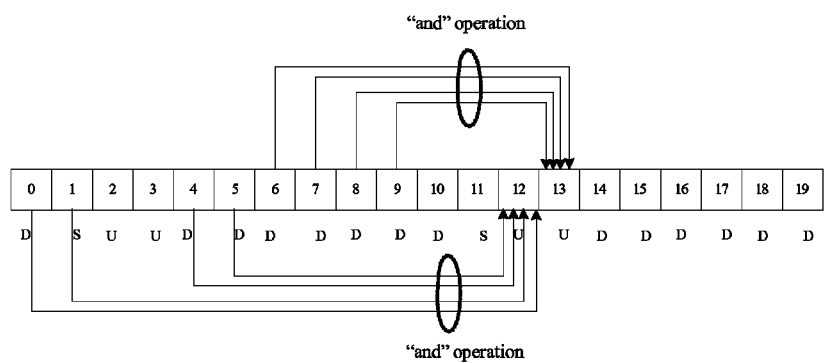
FIG. 3 is a schematic drawing of the corresponding relationship between the uplink/downlink sub-frames when feeding back is performed in a processing example of the method according to the embodiments of the present invention.

Take the LTE TDD system as an example, assume that 20 continuous sub-frames are present, and the uplink/downlink proportion configuration is in the situation of configuration 4 in above Table 1, namely, sub-frame 0, sub-frame 1, sub-frame 4, sub-frame 5, sub-frame 6, sub-frame 7, sub-frame 8, sub-frame 9, sub-frame 10, sub-frame 11, sub-frame 14, sub-frame 15, sub-frame 16, sub-frame 17, sub-frame 18 and sub-frame 19 are downlink sub-frames, sub-frame 2, sub-frame 3, sub-frame 12 and sub-frame 13 are uplink sub-frames, according to a downlink timing relationship, the ACK/NACK of sub-frames 0, 1, 4 and 5 is fed back on sub-frame 12, the ACK/NACK of sub-frames 6, 7, 8 and 9 is fed back on sub-frame 13. FIG. 3 is a schematic drawing of the corresponding relationship between the uplink/downlink sub-frames when feeding back is performed in a processing example of the method according to the embodiments of the present invention. As shown in FIG. 3, D in the figure represents the downlink sub-frame, U represents the uplink sub-frame, and S represents the special sub-frame, and at this moment, H={1, 2, 3, 4};

Assume that the eNodeB sends the data on downlink sub-frames 6, 7, 8 and 9 to the object UE, the object transmits the uplink data and the ACK/NACK information of the corresponding downlink sub-frames on sub-frame 13;

The signaling information of DCI format 0 of the object UE is sent on downlink sub-frame 6, and the signaling, specially used in TDD system in DCI format 0 to indicate the index of the uplink sub-frame where the uplink data is located, is used to represent the number of the downlink sub-frames carrying the data sent by the eNodeB to the object UE;

The object UE detects the information of DCI format 0 on downlink sub-frame 6 and acquire that there is data being sent on downlink sub-frames 6, 7, 8 and 9, the object UE detects the corresponding downlink control channel on downlink sub-frames 6, 7, 8 and 9, to find the positions of the corresponding downlink data according to the downlink control channel for decoding. If the decoding is correct, an ACK is fed back; if the decoding is incorrect, an NACK is fed back. When the corresponding downlink control channel is not detected on the object downlink sub-frame, this downlink sub-frame feeds back the NACK;

Finally, the feedback information sequentially arranged according to the serial numbers of the downlink sub-frames is sent on the PUSCH together with the uplink data;

If the number of the downlink sub-frames carrying the data sent by the eNodeB to the object UE is 1, it is the multiple codeword stream transmission on this downlink sub-frame, each codeword stream feeds back one piece of the confirmation information, if the decoding is correct, the ACK is fed back, and if the decoding is incorrect, the NACK is fed back, finally, the confirmation information arranged according to the serial numbers of the codeword streams is sent on the PUSCH together with the uplink data;

If the number of the downlink sub-frames carrying the data sent by the eNodeB to the object UE is greater than 1, there is multiple codeword stream transmission in this downlink sub-frame, the downlink sub-frames of the multiple codeword stream transmission need to combine the confirmation information of a plurality of codeword streams into one piece of the confirmation information as the confirmation information of this sub-frame, finally, the confirmation information arranged according to the serial numbers of the downlink sub-frames is sent on the PUSCH together with the uplink data.

To sum up, the present invention accomplishes the objective of sending the ACK/NACK of a plurality of downlink sub-frames on an uplink PUSCH. By the technical solutions of the present invention, the feedback efficiency and the system work efficiency can be effectively improved, the characteristic of the uplink single carrier is ensured, the problem of the lost of downlink data is solved, the delay is reduced, and the capability of the system is ensured.

Apparently, the person skilled in the art should understand that each step of the present invention above may be realized by the general calculating apparatus; they may be collected in a single calculating apparatus or distributed on the network formed by a plurality of the calculating apparatus. Selectively, they may be realized by the program codes executable by the calculating apparatus, therefore, they can be stored in the storing apparatus to be executed by the calculating apparatus, or they can be fabricated into integrated circuit modules respectively, or a plurality of the steps thereof are fabricated into individual integrated circuit module for the accomplishment. Thus, the present invention is not limited to the combination of any particular hardware and software.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. A method for feeding back confirmation information on a physical uplink shared channel, which is used for enabling a user equipment to feed back to an eNodeB whether data of a downlink sub-frame is correctly received in a situation that a number of the downlink sub-frames is greater than a number of uplink sub-frames in a time division duplex system, wherein the method comprises:

the eNodeB carries, in downlink control information, a number value of the downlink sub-frame corresponding to the confirmation information which is fed back by one uplink sub-frame, and transmits data on a plurality of continuous downlink sub-frames after the sub-frame carrying the downlink control information, wherein the number of the downlink sub-frames which transmit the data is equal to a number of the downlink sub-frames corresponding to the confirmation information fed back by the one uplink sub-frame;

after the user equipment receives the downlink sub-frame which carries the downlink control information, the data is received from the downlink sub-frame which transmits the data after this downlink sub-frame, and the confirmation information of receiving the data is fed back together with uplink data to the eNodeB through a physical uplink shared channel through an uplink sub-frame;

wherein, in a situation that the user equipment feeds back a plurality of groups of the confirmation information, an amount of the confirmation information fed back in each group is equal to a maximum number of codeword streams in this downlink sub-frame, and respective confirmation information in each group corresponds to the confirmation information of the codeword stream of a corresponding downlink sub-frame; in the situation that the number of codeword streams of the downlink sub-frames is smaller than the maximum number of the codeword streams of the downlink sub-frame, the user equipment feeds back the confirmation information of the number of the maximum codeword streams, wherein confirmation information without a corresponding codeword stream is set as a predefined fixed value; when the user equipment fails to detect the physical downlink control channel corresponding to the transmitted data in the sub-frame which transmits the data, the user equipment feeds back the negative acknowledgement message as the confirmation information of each codeword stream in a group corresponding to this downlink sub-frame.

2. The method according to claim 1, wherein the eNodeB uses a signaling in the downlink control information for representing an index of the uplink sub-frame for transmitting uplink data in the situation that the number of the downlink sub-frames is smaller than the number of the uplink sub-frames to carry the number of the downlink sub-frames corresponding to the confirmation information which is fed back by the one uplink sub-frame.

3. The method according to claim 1, wherein the eNodeB determines a set of number values of all the downlink sub-frames corresponding to information which is fed back by the one uplink sub-frame according to a configuration pattern for the current number of downlink/uplink sub-frames, and selects corresponding number values from the set according to an amount of the data actually required to be transmitted to be carried in the downlink control information.

4. The method according to claim 1, wherein the eNodeB sends a control signaling associated with the allocation of the physical uplink shared channel on a first downlink sub-frame in the downlink sub-frames corresponding to the confirmation information fed back by the uplink sub-frame.

5. The method according to claim 1, wherein in the uplink sub-frames fed back to the eNodeB, the user equipment, according to the order of serial numbers of the received downlink sub-frames which transmit the data, receives each downlink sub-frame which transmits the data and feeds back corresponding confirmation information.

6. The method according to claim 1, wherein in a situation that the user equipment fails to receive the data of in the sub-frame, the user equipment feeds back a negative acknowledgement message as the confirmation information of this downlink sub-frame; in a situation that the user equipment detects the physical downlink control channel corresponding to the transmitted data in the sub-frame transmitting the data, the user equipment analyzes the data in this downlink sub-frame, and feeds back an acknowledgement message as the confirmation information in a situation that the analysis is successful, otherwise, the negative acknowledgement message is fed back as the confirmation information.

7. The method according to claim 6, wherein
in a situation that the data in the downlink sub-frame that transmits the data is sent as a single codeword stream, each piece of confirmation information in the uplink sub-frame fed back by the user equipment to the eNodeB corresponds to a codeword stream of one downlink sub-frame that transmits the data;
in a situation that the data in the downlink sub-frame that transmits the data is sent as multiple codeword streams, for one downlink sub-frame that transmits the data, the user equipment acquires the confirmation information corresponding to each codeword stream thereof, in a situation that any one or more pieces of confirmation information among the confirmation information acquired is the negative acknowledgement message, the user equipment sets the confirmation information of this downlink sub-frame as a negative acknowledgement; in a situation that all the confirmation information acquired is the acknowledgement message, the user equipment sets the confirmation information of this downlink sub-frame as an acknowledgement.

8. The method according to claim 1, wherein in a situation that the downlink sub-frames sent by the eNodeB to the user equipment includes special sub-frames which cannot transmit data, the user equipment does not consider the special sub-frames when feeding back the confirmation information.

9. A method for feeding back confirmation information on a physical uplink shared channel, wherein, when the confirmation information is fed back together with uplink data on the physical uplink shared channel, in a situation that a user equipment fails to detect a physical downlink control channel corresponding to transmitted data in a sub-frame transmitting data, the user equipment feeds back a negative acknowledgement message as confirmation information of this downlink sub-frame; in a situation that the user equipment detects the physical downlink control channel corresponding to the transmitted data in the sub-frame transmitting the data, the user equipment analyzes data in this downlink sub-frame, and feeds back an acknowledgement message as the confirmation information in a situation that the analysis is successful, otherwise, the negative acknowledgement message is fed back as the confirmation information;

wherein in a situation that the user equipment feeds back a plurality of groups of the confirmation information, an amount of the confirmation information fed back in each group is equal to a maximum number of codeword streams in this downlink sub-frame, and respective confirmation information in each group corresponds to the confirmation information of the codeword stream of a corresponding downlink sub-frame;

in a situation that the number of the codeword streams of the downlink sub-frame is smaller than the maximum number of the codeword streams of the downlink sub-frame, the user equipment feeds back the confirmation information of the maximum number of the codeword streams, wherein confirmation information without a corresponding codeword stream is set as a predefined fixed value;

when the user equipment fails to detect the physical downlink control channel corresponding to the transmitted data in the sub-frame which transmits the data, the user equipment feeds back the negative acknowledgement message as the confirmation information of each codeword stream in a group corresponding to this downlink sub-frame.

10. The method according to claim 9, wherein in a situation that the data in the downlink sub-frame that transmits the data is sent as a single codeword stream, each piece of confirmation information in the uplink sub-frame fed back by the user equipment to an eNodeB corresponds to a codeword stream of one downlink sub-frame that transmits the data;

in a situation that the data in the downlink sub-frame which transmits the data is sent as multiple codeword streams, for one downlink sub-frame that transmits the data, the user equipment acquires the confirmation information corresponding to each codeword stream thereof, in a situation that any one or more pieces of confirmation information among the confirmation information acquired is the negative acknowledgement message, the user equipment sets the confirmation information of this downlink sub-frame as a negative acknowledgement; in a situation that all the confirmation information acquired is the acknowledgement message, the user equipment sets the confirmation information of this downlink sub-frame as an acknowledgement.

11. The method according to claim 2, wherein in a situation that the user equipment fails to detect a physical downlink control channel corresponding to transmitted data in the sub-frame transmitting the data, or fails to receive the data thereof, the user equipment feeds back a negative acknowledgement message as the confirmation information of this downlink sub-frame; in a situation that the user equipment detects the physical downlink control channel corresponding to the transmitted data in the sub-frame transmitting the data, the user equipment analyzes the data in this downlink sub-frame, and feeds back an acknowledgement message as the confirmation information in a situation that the analysis is successful, otherwise, the negative acknowledgement message is fed back as the confirmation information.

12. The method according to claim 3, wherein in a situation that the user equipment fails to detect a physical downlink control channel corresponding to transmitted data in the sub-frame transmitting the data, or fails to receive the data thereof, the user equipment feeds back a negative acknowledgement message as the confirmation information of this downlink sub-frame; in a situation that the user equipment detects the physical downlink control channel corresponding to the transmitted data in the sub-frame transmitting the data, the user equipment analyzes the data in this downlink sub-frame, and feeds back an acknowledgement message as the confirmation information in a situation that the analysis is successful, otherwise, the negative acknowledgement message is fed back as the confirmation information.

13. The method according to claim 4, wherein in a situation that the user equipment fails to detect a physical downlink control channel corresponding to transmitted data in the sub-frame transmitting the data, or fails to receive the data thereof, the user equipment feeds back a negative acknowledgement message as the confirmation information of this downlink sub-frame; in a situation that the user equipment detects the physical downlink control channel corresponding to the transmitted data in the sub-frame transmitting the data, the user equipment analyzes the data in this downlink sub-frame, and feeds back an acknowledgement message as the confirmation information in a situation that the analysis is successful, otherwise, the negative acknowledgement message is fed back as the confirmation information.

14. The method according to claim 5, wherein in a situation that the user equipment fails to detect a physical downlink control channel corresponding to transmitted data in the sub-frame transmitting the data, or fails to receive the data thereof, the user equipment feeds back a negative acknowledgement message as the confirmation information of this downlink sub-frame; in a situation that the user equipment detects the physical downlink control channel corresponding to the transmitted data in the sub-frame transmitting the data, the user equipment analyzes the data in this downlink sub-frame, and feeds back an acknowledgement message as the confirmation information in a situation that the analysis is successful, otherwise, the negative acknowledgement message is fed back as the confirmation information.

* * * * *